United States Patent [19]

Vokey et al.

[11] Patent Number: 5,793,590
[45] Date of Patent: Aug. 11, 1998

[54] COAXIAL CABLE PROTECTION DEVICE

[75] Inventors: David E. Vokey, Bellingham, Wash.;
Kenneth N. Sontag, Springfield,
Canada; John C. Chamberlain,
Hickory, N.C.; Oleh J. Sniezko,
Highlands Ranch, Colo.

[73] Assignee: Norscan Instruments, Ltd., Winnipeg,
Canada

[21] Appl. No.: 878,182

[22] Filed: Jun. 18, 1997

[51] Int. Cl.$^6$ ........................................ H02H 3/18
[52] U.S. Cl. ...................... 361/79; 361/45; 361/49;
361/107; 333/206
[58] Field of Search .......................... 361/79, 86, 87,
361/42, 45, 49, 93, 107, 108; 333/206

[56] References Cited

U.S. PATENT DOCUMENTS

| | | | |
|---|---|---|---|
| 3,576,469 | 4/1971 | McNitt et al. | 361/50 |
| 4,099,217 | 7/1978 | Fitchew | 361/56 |
| 4,987,391 | 1/1991 | Kusiak, Jr. | 333/12 |
| 5,053,910 | 10/1991 | Goldstein | 361/111 |

*Primary Examiner*—Jeffrey A. Gaffin
*Assistant Examiner*—Michael J. Sherry
*Attorney, Agent, or Firm*—Stevens, Davis, Miller & Mosher, L.L.P.

[57] ABSTRACT

A coaxial drop cable safety device is used for cable television, data and telephony applications. The device is used on buried drop cable where 60 Hz powering voltages applied to the drop cable exceed low voltage safety limits and where the drop cable is buried at depths which is less than the minimum required to meet electrical safety codes. Tap end and premise end units are connected to the drop cable. The tap end unit applies a DC voltage to the center conductor of the drop cable. A monitoring circuit in the tap end unit monitors the center conductor DC voltage to a fault from the center conductor to ground along the drop cable. The tap unit will immediately remove the powering voltage in the event of either an open or faulted condition on the center conductor along the entire length of the drop cable. Additionally, while providing fault protection for the low frequency powering circuit due to tampering or damage to the cable, the fault monitoring circuit allows the high frequency television, data and telephony signals to pass with little or no impediment.

10 Claims, 3 Drawing Sheets

5,793,590

1

COAXIAL CABLE PROTECTION DEVICE

FIELD OF THE INVENTION

The present invention relates to the protection of conductive cables and more particularly to the protection of cables carrying both signal traffic and AC power.

BACKGROUND

Coaxial cable has been installed extensively by cable television (CATV) operating companies to bring multi-channel wideband television services to homes. These services have provided almost exclusively downstream signal transmission to the customer with little or no upstream or interactive communication from the customer to the head end. With deregulation of the cable television and telephone industries, opportunities exist to provide two way data and telephone services over the cable television coaxial cable network.

These new services require electronic circuits at the customer end to separate and direct the television, data and telephone signals. Electrical power is required to operate these circuits. Additionally, the telephone circuits and sets in the home require DC power for operation. Conventional telephones are powered and communicate over the copper pair which connects the telephone to the telephone company equipment. The cable television distribution system is passive at the distribution to the home with no power available for powering customer equipment.

To provide new services over the coaxial cable distribution network, power for operating the circuits at the customer end is required. Power could be derived from the electric power system, but this has the disadvantage of connection to mains power and the need for a backup battery in case of power failure. It is therefore preferable to power the home equipment independently from the drop cable to the house.

As the majority of homes in suburban areas have a coaxial cable service cable already provided it is economically preferable to use the existing drop to also provide the home circuit powering. It has been determined that the power supplied over the coaxial cable should be in the at voltage levels of 90 V AC or more to ensure adequate powering over a typical CATV distribution system. At this voltage level, electrical codes require that a buried service entrance cable be buried at a depth of 18 inches or more to limit exposure to hazardous voltages. A significant portion of the buried CATV coaxial cable drop cables are buried at depths less than the minimum requirement.

A ground fault protection device is required to ensure safe operation without having to replace the existing drop cable. This poses a unique problem as the outer conductor of the coaxial cable is normally grounded and there is no simple means to distinguish between a power load from the center conductor to ground and an unintended fault to ground along the drop cable.

The present invention aims at the provision of a system for mitigating these problems.

SUMMARY

According to the present invention, there is provided a cable protection system for a cable having first and second conductors for carrying an electric signal and AC power from a source to a destination, the system comprising:

a first circuit component for passing the signal to the first conductor;

2 a second circuit component with an active state for passing the AC power to the first conductor and a blocking state for selectively blocking the passage of the AC power to the first conductor;

monitoring means including means for monitoring the electrical resistance between the first and second conductors; and actuation means for actuating the second circuit component to the blocking state in response to detection by the monitoring means of a value of said electrical resistance representing a faulted or open circuit condition of the first conductor.

The system thus removes the powering voltage In the event of either an open circuit or faulted condition on the first conductor, which will be the center conductor of a coaxial drop cable. Additionally, while providing fault protection for the low frequency powering circuit due to tampering or damage to the cable, the system allows the high frequency television, data and telephony signals to pass with little or no impediment.

The monitoring means may include means for generating a regulated DC voltage and applying that voltage to a voltage divider with branches at opposite ends of the center conductor. The voltage balance of the divider then indicates a faulted or open circuit condition of the conductor. The DC voltage is limited to the drop cable and the system can thus distinguish between a normal end located load and a fault from the center conductor to ground along the drop cable.

BRIEF DESCRIPTION OF THE DRAWINGS

In the accompanying drawings, which illustrate an exemplary embodiment of the present invention.

DETAILED DESCRIPTION

Figure 1:
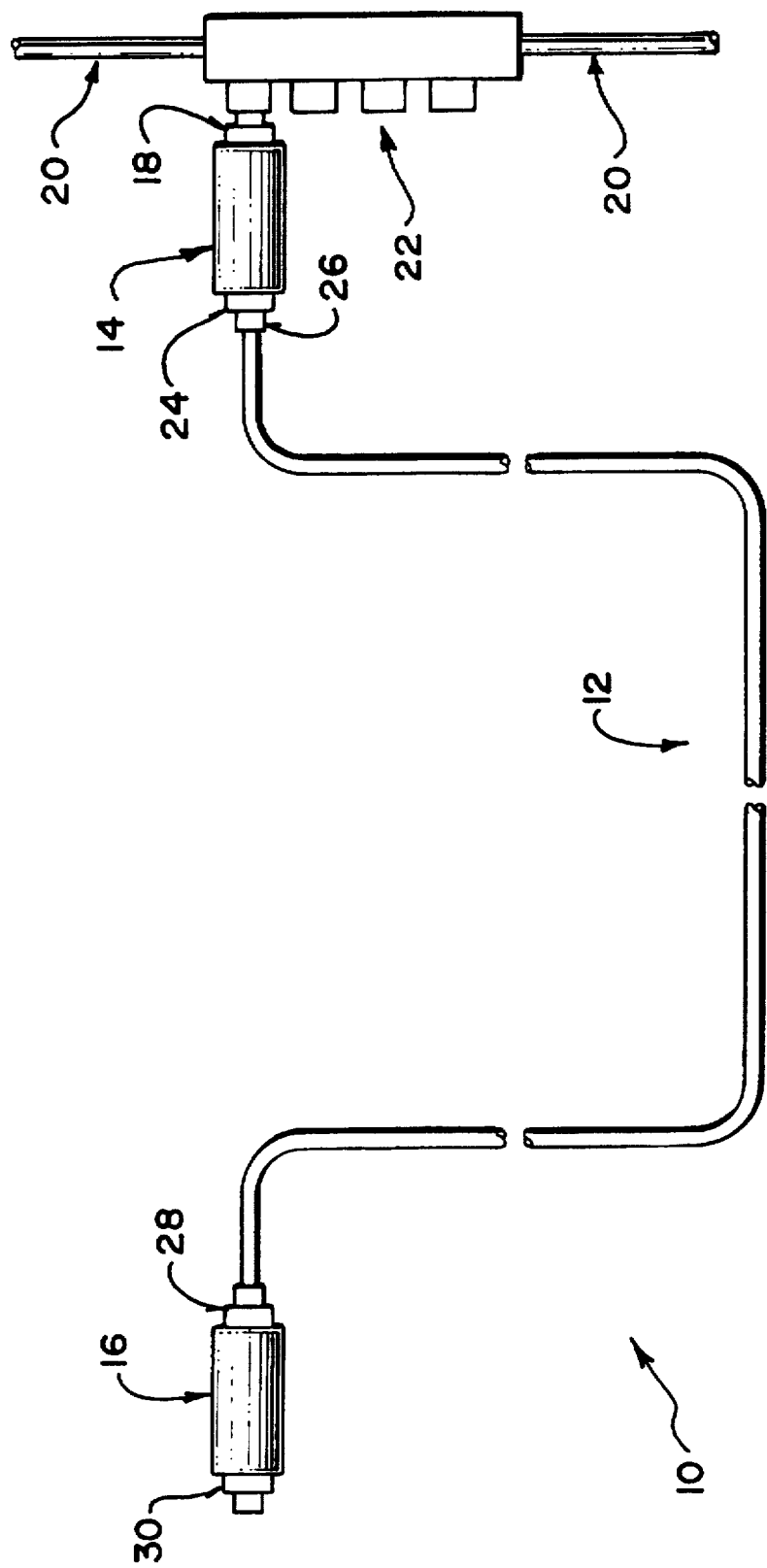
FIG. 1 is an illustration of a system according to the present invention.

Referring to the drawings, and especially FIG. 1, there is illustrated a coaxial drop cable safety system 10 for cable television, data and telephony applications. The system is used on a buried drop cable 12 where 60 Hz powering voltages applied to the drop cable exceed low voltage safety limits and where the drop cable is buried at depths which is less than the minimum required to meet electrical safety codes.

The system is housed in two separate units, a tap unit 14 and a premise unit 16. The tap unit has an input 18 connected to a main distribution cable 20 at a tap 22. The output 24 of the tap unit is connected via a coaxial cable connector 26 to the coaxial drop cable 12. At the opposite end of the drop cable, the premise unit 16 has an input 28 connected to the drop cable and an output 30 for connection to the premise equipment (not illustrated).

Figure 2:
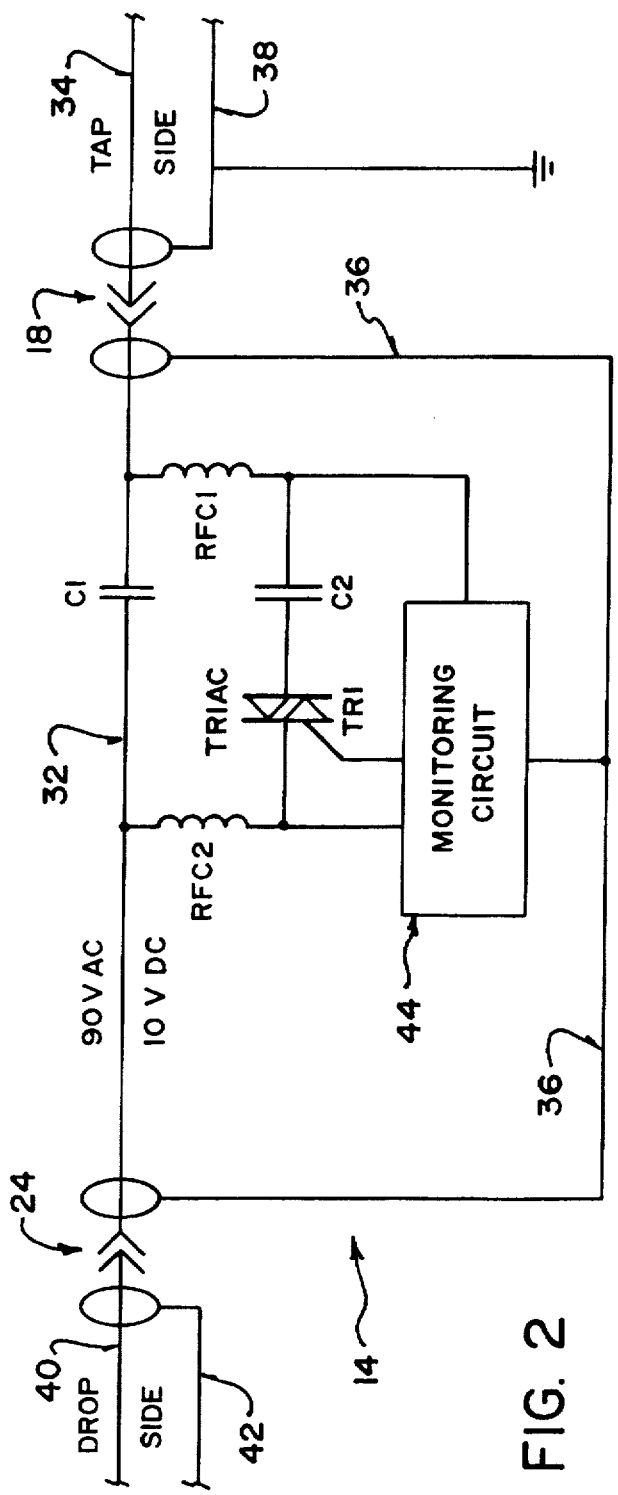
FIG. 2 is a generalized schematic of a tap unit circuit.

Referring to the tap unit basic circuit in FIG. 2, this includes a center conductor 32 connected by input 18 to the signal and AC power carrying conductor 32 of the tap. An outer conductor 36 is similarly connected to a grounded outer conductor 38. At the output 24, the center conductor 32 and the outer conductor 36 are connected to the center conductor 40 and the outer conductor 42 respectively of the drop cable 12. A radio frequency (RF) coupling capacitor C1 is connected in center conductor 32. Between input 18 and capacitor C1, the center conductor is connected to an RF coil RFC1 which is in turn connected to an AC power coupling capacitor C2 and a monitoring circuit 44. The other side of capacitor C2 is connected through a triac TR1 and a second RF coil RFC2 to the center conductor 32 between the output 24 and capacitor C1. The monitoring circuit 44 is connected to coils RFC1 and RFC2 and to the trigger of triac TR1.

The premise unit circuit 16 includes a center conductor 46 connected by input 28 to the center conductor of cable 12. An outer conductor 48 is connected to the outer conductor 42 of cable 12. The center and outer conductors 46 and 48 are connected to the output 30. An RF coupling capacitor C9 connected in center conductor 46 Between input 28 and capacitor C2, the center conductor is connected to an RF coil RFC3 which is in turn connected to an AC power coupling capacitor C10 and a resistor R25. The other side of capacitor C10 is connected through a second RF coil RFC4 to the center conductor 46 between the output 30 and capacitor C9. A resistor R26 and lamp 50 are connected in series from a point between capacitor C10 and coil RFC4 to grounded outer conductor 48.

The operation of the circuits is as follows:

The AC power and RF signals are applied to the input connector at the tap side.

The RF signal is applied to the center conductor via coupling capacitor C1.

The AC power is applied to one side of C2 via RFC1 and to the monitoring circuit.

The monitoring circuit develops a DC supply voltage which is applied to the inner conductor 32 of the drop cable through RFC2.

The termination resistor R25 at the premise end circuit forms one part a voltage divider which places one half of the supply voltage on the center conductor which is detected by the monitoring circuit.

With no fault to ground from the center conductor, the monitoring circuit applies a triggering signal to the Triac which conducts, connecting capacitor C2 in parallel with capacitor C1 in the center conductor path. The AC power currents are passed through RFC1, C2 and RFC2 thereby applying AC power to the drop cable.

If a fault appears from the center conductor to ground, the voltage to ground drops and the drop in voltage is detected by the monitoring circuit. The triggering signal to the triac is turned off, which opens the powering circuit.

If the voltage to ground on the center conductor increases such as would occur if the circuit to the premise unit is opened, the monitoring circuit removes the triggering signal thereby turning off the triac which opens the powering circuit.

Figure 3:
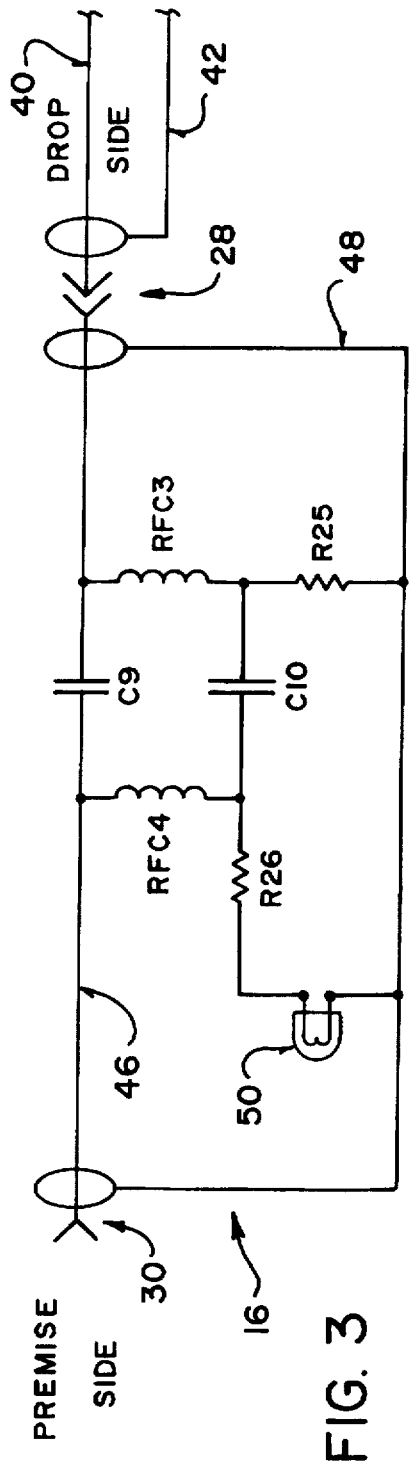
FIG. 3 is a generalized schematic of a premise unit circuit.

With more specific reference to the basic circuit in FIG. 3, the operation of the premise unit circuit is as follows:

The DC monitoring, 90 V AC powering and RF signals are applied to the input connector at the drop cable side.

The RF signal is passed through via coupling capacitor C9.

The 90 V AC power is passed through RFC3, C10 and RFC4, and applied to the premise side connector 30.

As discussed above, the termination resistor R25 from the junction of RFC3 and C10 to the outer conductor forms one half of a voltage divider circuit which is detected by the monitoring circuit. When the power is applied the lamp is illuminated.

Figure 4:
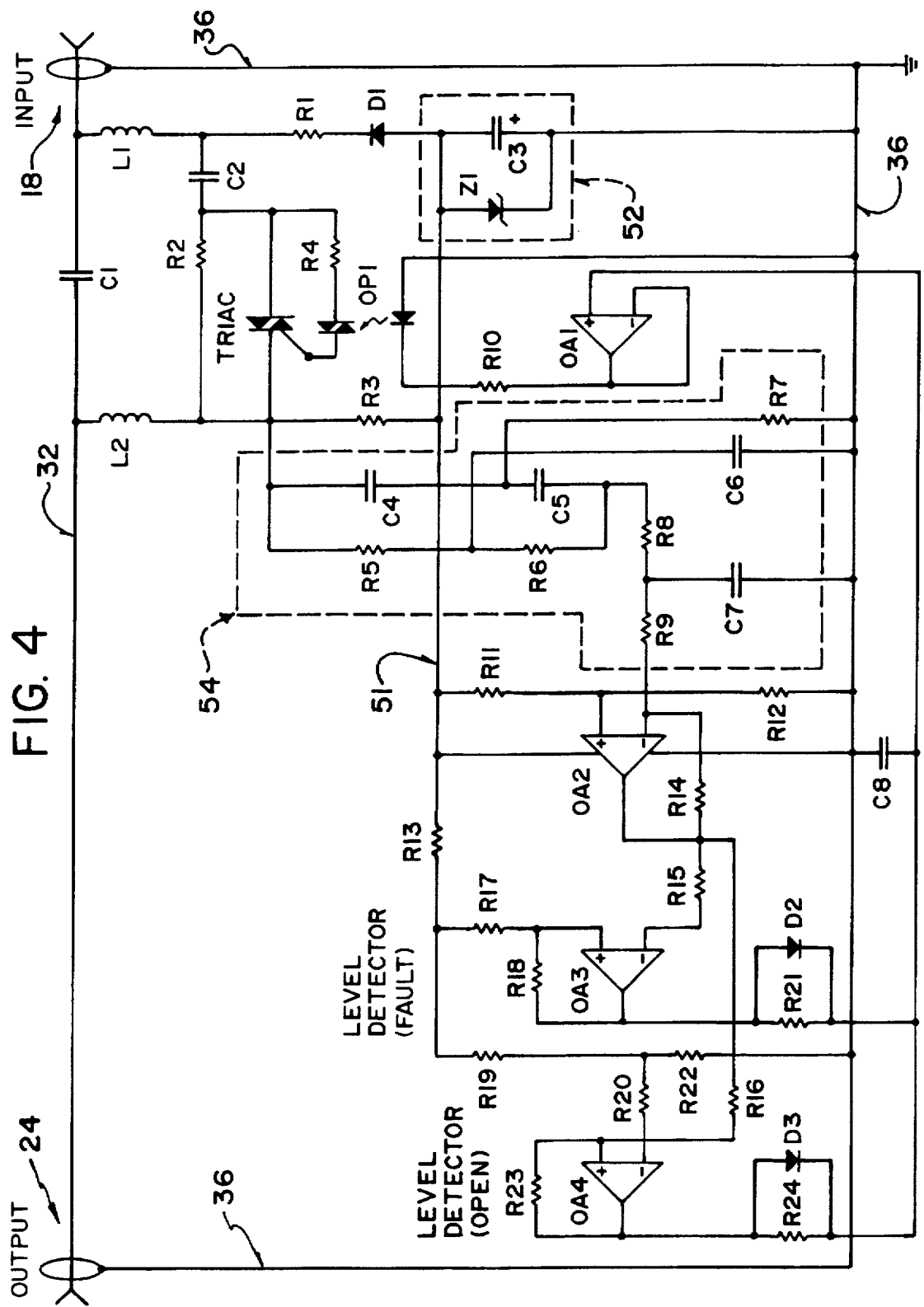
FIG. 4 is a detailed schematic of the tap unit circuit.

FIG. 4 illustrates a detailed schematic of the tap unit. The input 18 is connected to the tap 22 on the distribution cable 20 (FIG. 1). The RF signal is coupled through coupling capacitor C1 to the output connector 24. The 60 Hz power current passes through L1 (RFC1) to the junction of capacitor C2 and a resistor R1. Diode D1 is connected in series with R1. This rectifies the powering voltage which is applied to a zener Z1 and a capacitor C3, which are connected in parallel to form a regulated negative voltage DC power supply 52. The power supply is limited to the zener clamping voltage. The DC supply voltage is applied to a conductor 51. From conductor 51, the supply voltage is applied to the inner conductor 32 through a resistor R3 in series with inductance L2 (RFC2). The DC supply voltage is also connected to a quad op amp OA1–OA4 to power the monitoring circuits.

At the premise end, resistor R25, which is of equal value to resistor R3, shunts the center conductor to ground thereby forming voltage divider. For a no fault condition the voltage divider produces a center conductor to ground DC reference voltage equal to one half of the DC supply voltage.

Resistor R5 and capacitor C4 are connected to the junction of resistors R3 and R2 and inductance L2. Resistor R6 and capacitor C5 are connected in series with resistor R5 and capacitor C4 respectively. A capacitor C6 is connected from the junction of resistors R5 and R6 to the grounded outer conductor 36 and a resistor R7 is connected between the junction of capacitors C4 and C5 and outer conductor 36. Resistor R6 and capacitor C5 are connected in series with resistors R8 and R9, which connect in turn to the negative input of differential amplifier OA2. A capacitor C7 is connected between the junction of resistors R8 and R9 and outer conductor 36. This applies the center conductor voltage to the negative input of amplifier OA2. The combination of resistors R5, R6, R7, R8 and R9 and capacitors C4, C5, C6 and C7 form a 60 Hz notch filter and a lowpass filter at the negative summing input of a differential amp OA2. The filters remove the 60 Hz powering voltages allowing only the DC monitoring voltage on center conductor 32 to reach the negative summing input.

Two equal resistors R11 and R12 form a voltage divider between the DC supply voltage on line 51 and grounded outer conductor 36. The center tap of the divider is connected to the positive input of differential amplifier OA2. This applies one half of the DC supply voltage to the positive input of OA2. The output of the differential amplifier is applied via resistors R15 and R16 to the inputs of negative and positive level detectors formed by differential amplifiers OA3 and OA4 respectively. Three resistors R13, R19 and R22 form a voltage divider referenced to the DC power supply which bias the other inputs of the level detectors OA3 and OA4 through resistors R17 and R20 respectively. The output of the resistive fault level detector OA3 is applied to the positive summing input of amplifier OA1 through resistor R21 and diode D2, connected in parallel. Similarly, the output of the open circuit fault level detector OA4 is applied to the positive summing input of amplifier OA1 through resistor R24 and diode D3, connected in parallel. A capacitor C8 between the positive input of amplifier OA1 and outer conductor 36 improves the transient response of OA1. The output of OA1 is applied to the input diode of optical coupler OP1 through a resistor R10.

In normal non faulted operation, one half of the DC supply voltage appears as a reference voltage from the center conductor to ground. The outputs of both level detectors are in the high state and OP1 is ON causing the triac to trigger which applies the 60 Hz powering voltage to the center conductor. A resistive fault to ground from the center conductor will cause the reference voltage on the center conductor to drop and the resistive fault level detector amplifier OA3 to switch to a low state which in turn causes OA1 to go low, shutting off OP1. The triggering to the triac is turned off and the triac stops conducting, which removes the 60 Hz power from the center conductor. The same shut off procedure will occur if the center conductor is opened or the premise unit is disconnected. An open circuit to the premise unit will cause the center conductor reference voltage to increase to the supply level which in turn causes the open circuit fault level detector amp OA4 to go low, shutting off the triac and removing the power from the center conductor.

The system thus monitors the drop cable, between the tap unit 14 and the premise unit 16 and removes AC power from the cable whenever an electrical fault occurs in the cable. At the same time, RF signals will continue to be passed through to the premise end of the system.

While one particular embodiment of the invention is described in the foregoing, this is by way of example only and is not to be construed as limiting. The invention is to be considered as limited solely by the scope of the appended claims.

We claim:

1. A cable protection system for a cable having first and second conductors for carrying an electric signal and AC power from a source to a destination, the system comprising:

a first circuit component for passing the signal to the first conductor;

a second circuit component with an active state for passing the AC power to the first conductor and a blocking state for selectively blocking the passage of the AC power to the first conductor;

monitoring means including means for monitoring the electrical resistance between the first and second conductors; and actuation means for actuating the second circuit component to the blocking state in response to detection by the monitoring means of a value of said electrical resistance representing a faulted condition of the first conductor.

2. A cable protection system according to claim 1 wherein the monitoring means comprise means for applying a DC reference voltage between the first and second conductors, and means for monitoring said reference voltage.

3. A cable protection system according to claim 2 wherein the monitoring means comprise a resistive fault detector for detecting a resistive fault between the first conductor and ground.

4. A cable protection system according to claim 3 wherein the monitoring means comprise an open fault detector for detecting an open circuit between the first conductor and ground.

5. A cable protection system according to claim 4 wherein the cable is a coaxial cable, the first conductor is a center conductor of the cable, the second conductor is an outer conductor of the cable, and the outer conductor is grounded.

6. A cable protection system according to claim 5 including a tap unit coupled to an input end of the cable and a premise unit coupled to an opposite output end of the cable, the tap unit including the first and second circuit components.

7. A cable protection system according to claim 6 wherein the monitoring means comprise a voltage regulator in the tap unit and a voltage divider with a first part in the tap unit coupled between the voltage regulator and the first conductor, and a second part in the premise unit coupled between the first conductor and the second conductor.

8. A cable protection system according to claim 7 wherein the first and second parts of the voltage divider comprise respective resistances of the same magnitude.

9. A cable protection system according to claim 7 wherein the voltage regulator produces a regulated DC supply voltage, the voltage divider applies a reference voltage that is a predetermined fraction of the supply voltage to the first conductor, the resistive fault detector comprises means for detecting an actual DC voltage on the first conductor greater than the reference voltage.

10. A cable protection system according to claim 9 wherein the open circuit fault detector comprises means for detecting an actual DC voltage on the first conductor less than the reference voltage.

* * * * *